United States Patent
Cong et al.

(10) Patent No.: US 8,830,683 B2
(45) Date of Patent: Sep. 9, 2014

(54) EXPANSION CARD AND MOTHERBOARD FOR SUPPORTING THE EXPANSION CARD

(75) Inventors: Wei-Dong Cong, Shenzhen (CN); Guo-Yi Chen, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 337 days.

(21) Appl. No.: 13/285,030

(22) Filed: Oct. 31, 2011

(65) Prior Publication Data
US 2013/0100627 A1  Apr. 25, 2013

(30) Foreign Application Priority Data
Oct. 25, 2011  (CN) .......................... 2011 1 0327375

(51) Int. Cl.
*H05K 1/14* (2006.01)
*H05K 1/11* (2006.01)
*H05K 7/00* (2006.01)

(52) U.S. Cl.
USPC ...... 361/737; 361/785; 361/803; 361/679.01; 361/679.32; 439/62; 710/300; 710/301

(58) Field of Classification Search
CPC ....... G06F 1/183; G06F 1/185; G06F 1/1632; G06F 1/1656; G06F 13/409; G06K 19/077; H01R 9/096; H01R 23/7005; H05K 1/141; H05K 1/142; H05K 1/117; H05K 1/144; H05K 7/1455; H05K 7/1422; H05K 7/1417; H05K 7/1402; H05K 7/1465; H05K 2201/10689

USPC ......... 361/728, 736, 737, 748, 784–786, 803, 361/679.01, 679.02, 679.31, 679.32; 710/300, 301; 439/61, 62, 67, 70, 71
See application file for complete search history.

(56) References Cited

U.S. PATENT DOCUMENTS

| | | | | |
|---|---|---|---|---|
| 5,805,903 | A * | 9/1998 | Elkhoury | 713/300 |
| 5,963,431 | A * | 10/1999 | Stancil | 361/803 |
| 6,046,912 | A * | 4/2000 | Leman | 361/784 |
| 6,301,104 | B1 * | 10/2001 | Hu | 361/679.02 |
| 6,647,451 | B1 * | 11/2003 | Barmore | 710/301 |
| 2004/0225798 | A1 * | 11/2004 | Miller et al. | 710/301 |
| 2006/0238991 | A1 * | 10/2006 | Drako | 361/796 |
| 2009/0213533 | A1 * | 8/2009 | Bulucea | 361/679.02 |
| 2010/0323536 | A1 * | 12/2010 | Crane et al. | 439/62 |
| 2012/0287569 | A1 * | 11/2012 | Santos | 361/679.32 |

* cited by examiner

*Primary Examiner* — Hoa C Nguyen
(74) *Attorney, Agent, or Firm* — Novak Druce Connolly Bove + Quigg LLP

(57) ABSTRACT

A motherboard assembly includes a motherboard and an expansion card. The motherboard includes an expansion slot, a storage device interface, a power connector, and a central processing unit (CPU). The expansion slot includes a protrusion, first signal pins connected to the CPU, first power pins connected to the power connector. The expansion card includes a circuit board. A storage unit, a display unit, a power circuit, and a serial advanced technology attachment (SATA) connector connected to the storage unit and the storage device interface of the motherboard are all arranged on the circuit board. A notch is defined in a bottom edge of the circuit board, to receive the protrusion. An edge connector is arranged on a bottom edge of the circuit board and includes second power pins connected to the power circuit, and second signal pins connected to the display unit.

3 Claims, 2 Drawing Sheets

EXPANSION CARD AND MOTHERBOARD FOR SUPPORTING THE EXPANSION CARD

CROSS-REFERENCE OF RELATED ART

Relevant subject matter is disclosed in a pending U.S. patent application with application Ser. No. 13/270,803 filed on Oct. 11, 2011, with the same title "EXPANSION CARD AND MOTHERBOARD FOR SUPPORTING THE EXPANSION CARD", which is assigned to the same assignee as this patent application.

BACKGROUND

1. Technical Field

The present disclosure relates to an expansion card and a motherboard for supporting the expansion card.

2. Description of Related Art

Display requirement of a server is low, but storage capacity requirement of the server is very high. Thus, hard disk drives and serial advanced technology attachment dual in-line memory modules (SATA DIMMs) are used for adding storage capacity of the server. However, the hard disk drives and SATA DIMMs are expensive, and a plurality of racks for installing the hard disk drives and a plurality of memory slots for installing the SATA DIMMs will occupy precious space. Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawing, like reference numerals designate corresponding parts throughout the several views.

DETAILED DESCRIPTION

The disclosure, including the drawings, is illustrated by way of example and not by way of limitation. References to "an" or "one" embodiment in this disclosure are not necessarily to the same embodiment, and such references mean at least one.

Figure 1:
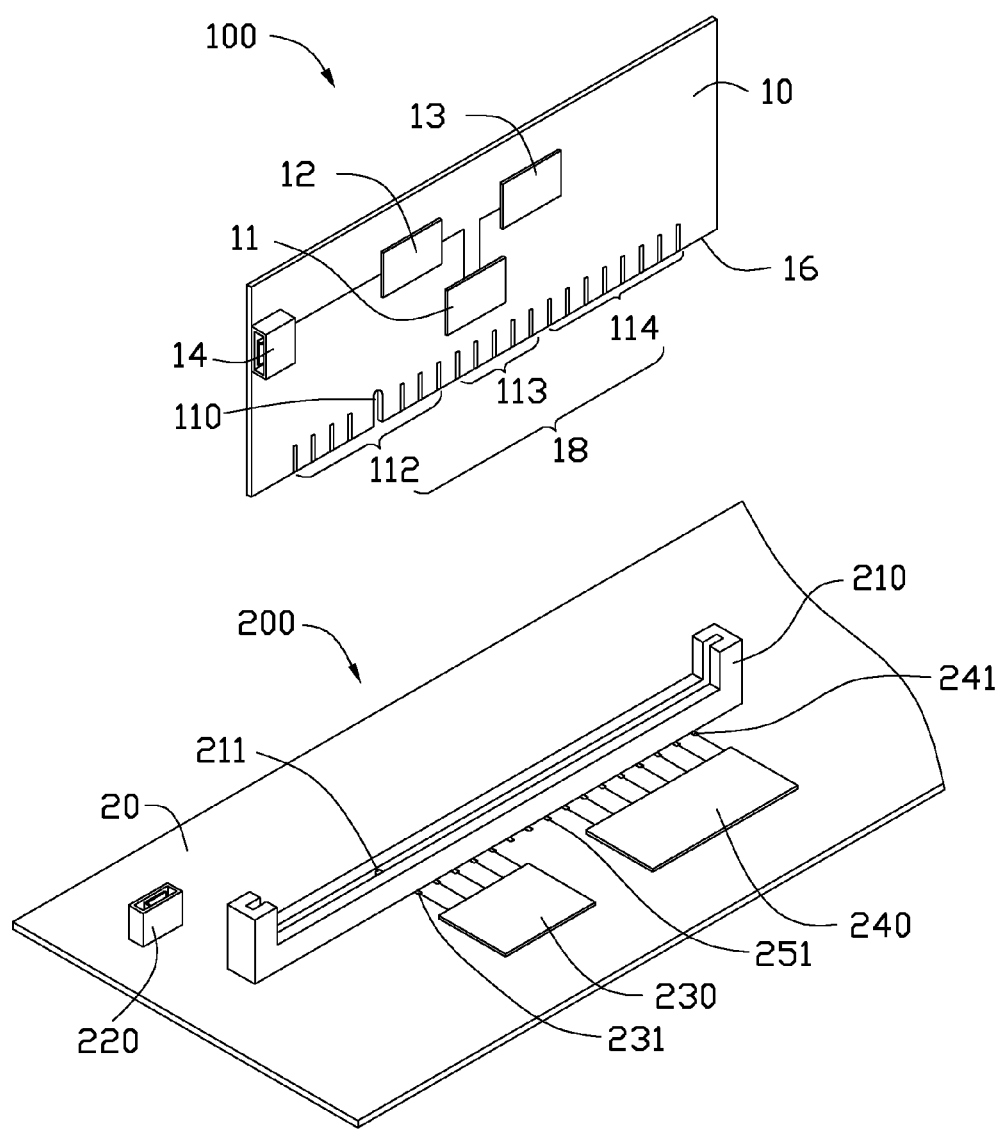
FIG. 1 is an exploded, isometric view of an expansion card and a motherboard for supporting the expansion card in accordance with an exemplary embodiment of the present disclosure.
Figure 2:
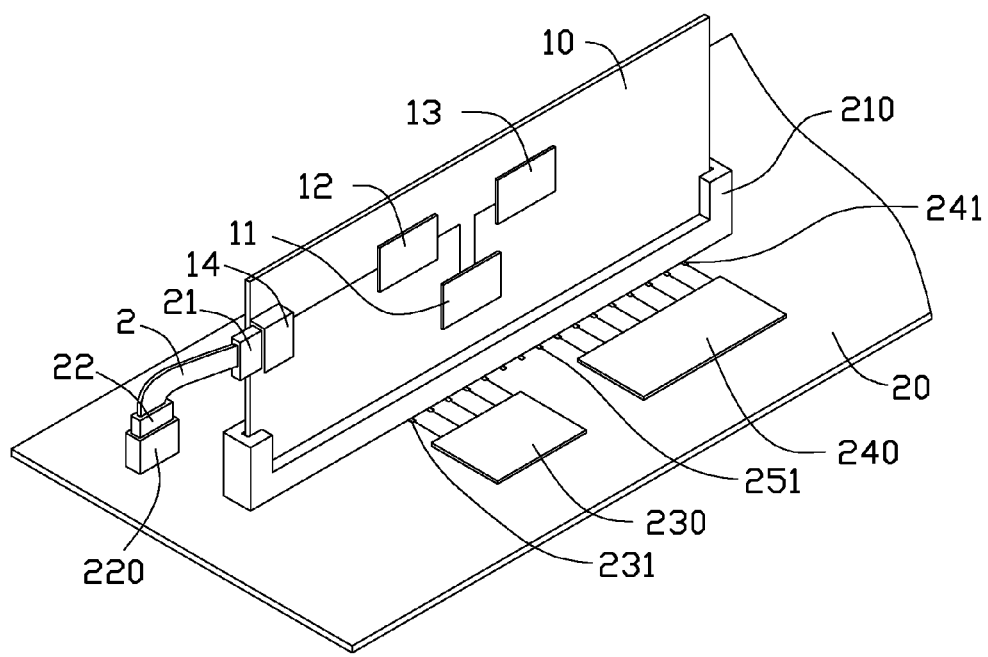
FIG. 2 is an assembled, isometric view of the expansion card and the motherboard of FIG. 1.

Referring to FIGS. 1 and 2, an expansion card 100 in accordance with an exemplary embodiment includes a substantially rectangular circuit board 10. A power circuit 11, a storage unit 12, a display unit 13, and a serial advanced technology attachment (SATA) connector 14 are arranged on the circuit board 10. In other embodiments, the SATA connector 14 may be an edge connector arranged on the circuit board 10, and accord with SATA standards. The power circuit 11 is connected to the storage unit 12 and the display unit 13. The SATA connector 14 is connected to the storage unit 12. An edge connector 18 and a notch 110 are arranged on a bottom edge 16 of the circuit board 10. The edge connector 18 includes a plurality of power pins 112, a plurality of ground pins 113, and a plurality of signal pins 114. The power pins 112 are connected to the power circuit 11. The signal pins 114 are connected to the display unit 13. The ground pins 113 are connected to a ground layer (not shown) of the circuit board 10. In one embodiment, the signal pins 114 transmit peripheral component interconnection express (PCIe) signals. The power circuit 11 converts a voltage from the edge connector 18 and provides the converted voltage to the storage unit 12 and the display unit 13. The storage unit 12 may be a solid state memory chip for storing data of a motherboard 200. The display unit 13 may be a general display card for enabling the motherboard 200 to display information.

The motherboard 200 includes a circuit board 20. An expansion slot 210, a storage device interface 220, a power connector 230, and a central processing unit (CPU) 240 are all arranged on the circuit board 20. In one embodiment, the expansion slot 210 is a peripheral component interconnection express (PCIe) slot. The expansion slot 210 includes a protrusion 211 arranged in the expansion slot 210, a plurality of power pins 231, a plurality of ground pins 251, and a plurality of signal pins 241. The power pins 231 are connected to the power connector 230. The ground pins 251 are connected to a ground layer (not shown) of the circuit board 20. The signal pins 241 are connected to the CPU 240. Namely, when the edge connector 18 of the expansion card 100 is inserted into the expansion slot 210, the protrusion 211 engages in the notch 110, the power pins 112 are connected to the power pins 231, the ground pins 113 are connected to the ground pins 251, and the signal pins 114 are connected to the signal pins 241. The SATA connector 14 is connected to the storage device interface 220 by a cable 2 with two cable interfaces 21 and 22.

In use, when the motherboard 200 receives power, the motherboard 200 outputs a voltage to the power circuit 11 through the power connector 230, the power pins 231, and the power pins 112. The power circuit 11 converts the received voltage and provides the converted voltage to the storage unit 12 and the display unit 13. At the same time, the CPU 240 outputs a bus signal, such as a PCIe signal to the display unit 13 through the signal pins 241 and the signal pins 114, to enable the display unit 13 to display information. The motherboard 200 outputs a control signal, such as a SATA signal to the storage unit 12 through the storage device interface 220, the cable 2, and the SATA connector 14, to enable the storage unit 12 to store data of the motherboard 200. Therefore, the storage capacity of the motherboard 200 is expanded. The expansion card 100 is price conscious and can save space.

Even though numerous characteristics and advantages of the disclosure have been set forth in the foregoing description, together with details of the structure and function of the disclosure, the disclosure is illustrative only, and changes may be made in detail, especially in matters of shape, size, and the arrangement of parts within the principles of the disclosure to the full extent indicated by the broad general meaning of the terms in which the appended claims are expressed.

What is claimed is:

1. An expansion card comprising:
a circuit board;
a serial advanced technology attachment (SATA) connector arranged on the circuit board, and to be connected to a storage device interface of a motherboard;
a power circuit arranged on the circuit board, to receive a voltage and convert the received voltage;
a storage unit arranged on the circuit board and connected to the power circuit and the SATA connector, to receive the converted voltage from the power circuit and receive a control signal from the SATA connector;

a display unit arranged on the circuit board and connected to the power circuit, to receive the converted voltage from the power circuit; and an edge connector and a notch arranged on a bottom edge of the circuit board, to be inserted into an expansion slot of the motherboard, wherein the edge connector comprises a plurality of power pins connected to the power circuit, a plurality of ground pins, and a plurality of signal pins connected to the display unit.

2. A motherboard assembly comprising:

a motherboard comprising a first circuit board, an expansion slot mounted on the first circuit board, a power connector mounted on the first circuit board, a storage device interface mounted on the first circuit board, and a central processing unit (CPU) mounted on the first circuit board, the expansion slot comprising a protrusion, a plurality of first power pins electrically connected to the power connector, a plurality of first ground pins, and a plurality of first signal pins connected to the CPU; and an expansion card comprising a second circuit board, a serial advanced technology attachment (SATA) connector arranged on the second circuit board and to be connected to the storage device interface of the motherboard, a power circuit arranged on the second circuit board, a storage unit arranged on the second circuit board and connected to the power circuit and the SATA connector, a display unit arranged on the second circuit board and connected to the power circuit, and an edge connector and a notch set on a bottom edge of the second circuit board to be detachably engaged in the expansion slot of the motherboard, the edge connector comprising a plurality of second power pins connected to the power circuit, a plurality of second ground pins, and a plurality of second signal pins connected to the display unit;

wherein when the edge connector of the expansion card is engaged in the expansion slot of the motherboard, the protrusion is engaged in the notch, the second power pins of the expansion card are connected to the first power pins of the expansion slot, and the second signal pins of the expansion card are connected to the first signal pins of the expansion slot.

3. The motherboard assembly of claim 2, wherein the expansion slot is a peripheral component interconnection express slot.

* * * * *